United States Patent [19]

Tellert

[11] 4,355,243
[45] Oct. 19, 1982

[54] SINUSOIDAL OUTPUT GENERATOR

[75] Inventor: Rudy Tellert, Schweinfurt, Fed. Rep. of Germany

[73] Assignee: Sachs-Systemtechnik GmbH, Schweinfurt, Fed. Rep. of Germany

[21] Appl. No.: 109,183

[22] Filed: Jan. 2, 1980

[30] Foreign Application Priority Data

Jan. 15, 1979 [DE] Fed. Rep. of Germany ....... 2901326

[51] Int. Cl.³ .............................................. H03K 5/08
[52] U.S. Cl. .................................... 307/261; 307/255; 328/27; 331/113 R
[58] Field of Search .................. 307/260, 261; 328/16, 328/27; 331/128, 113, 117

[56] References Cited

U.S. PATENT DOCUMENTS 3,247,468  4/1966  Pintell ............................... 328/27 X
3,774,052  11/1973  McClain .............................. 307/255

*Primary Examiner*—Stanley D. Miller, Jr.
*Assistant Examiner*—B. P. Davis
*Attorney, Agent, or Firm*—Toren, McGeady & Stanger

[57] ABSTRACT

In the disclosed device, a square wave generator drives a network composed of a parallel resonant circuit in series with a series resonant circuit. The resonant frequency of the parallel resonant circuit is substantially equal to the fundamental frequency of the square wave voltage generator and lower than the resonant frequency of the series resonant circuit. The resonant frequency of the series resonant circuit is lower than the frequency of the third harmonic of the square wave voltage generator. A load coupleable to the parallel resonant circuit has a complex impedance which shifts the current at the fundamental frequency about 30° relative to the fundamental square wave voltage.

2 Claims, 9 Drawing Figures

SINUSOIDAL OUTPUT GENERATOR

BACKGROUND OF THE INVENTION

The invention relates to a waveform generator, and particularly one in which a network composed of a series resonant circuit in series with a parallel resonant circuit is connected to a square wave voltage generator and the load can be coupled to the parallel resonant circuit, and wherein the resonant frequency of the parallel resonant circuit is essentially equal to the basic frequency of the square wave voltage generator and smaller than the resonant frequency of the series resonant circuit.

A sinusoidal output generator of this type has been proposed in German Offenlegungsschrift No. 26 48 758 for use in an induction heating apparatus. Induction heating apparatus are based on the principle of the formation of eddy currents in an electrically conductive body to be heated, which is in the alternating magnetic field of the coil of the parallel resonant circuit. The square wave voltage generator impresses a square wave voltage on the series connection of parallel resonant circuit and series resonant circuit, while the flow of the generator current as a function of time is determined by the resonant circuits. The parallel resonant circuit is adjusted to the basic or fundamental frequency of the square wave voltage, so that, during no-load operation of the generator, the basic frequency component of the generator current and, thus, the no-load losses caused by this current component are kept low.

However, in addition to the sine wave basic component of the generator current, the square wave voltage generates a plurality of harmonic waves. However the resistance of the parallel resonant circuit is low for the currents of the harmonic waves, so that relatively high losses occur in the known circuit even in the case of no-load. To keep the no-load losses caused by the harmonics as low as possible, the series resonant circuit is adjusted to a frequency which is slightly above the resonant frequency of the parallel resonant circuit. In this manner, there is little influence on the basic frequency component of the generator current, while its harmonic waves, particularly its third harmonic, are suppressed.

The known generator has the disadvantage that, although the no-load losses can be reduced, the efficiency of the generator is low and the power drain in the square wave voltage generator during operation is relatively high because of the misadjustment between the square wave voltage generator and the two resonant circuits which are connected in series.

SUMMARY OF THE INVENTION

It is the object of the invention to make the no-load losses as small as possible, while achieving a relatively high efficiency during load with corresponding low switching losses.

Starting from the generator mentioned hereinabove, this object is achieved in accordance with the invention by making the resonant frequency of the series resonant circuit lower than the frequency of the third harmonic of the basic frequency of the square wave voltage generator, by giving the load to be coupled to the parallel resonant circuit a complex impedance including an active component and a reactive component, and that the resonant circuits and/or the impedance of the load are dimensioned in such that, during when loaded, a phase displacement of about 20°–40°, preferably about 30°, occurs between the square wave output voltage and the fundamental frequency component of the output current of the square wave voltage generator.

Since the resonant frequency of the series resonant circuit is lower than the frequency of the third harmonic of the basic frequency of the square wave voltage generator, the impedance of the series resonant circuit, in the case of no-load operation as well as during load operation, uniformly exhibits a 90° inductive phase condition for the third harmonic of the output current of the square wave voltage generator. In this case, the resonant frequency of the series resonant circuit preferably is higher than the resonant frequency of the parallel resonant circuit by a factor of 1.4 to 2.2.

A particularly suitable factor is about 1.7.

Under load, the parallel resonant circuit is detuned by the complex impedance of the load to such an extent that the fundamental wave component of the output current of the square wave voltage generator is detuned 30° inductively relative to the square wave voltage. The sum of the out-of-phase basic frequency component and the phase-constant third harmonic results in an almost rectangular output current of the square wave voltage generator which lags the square wave voltage 30°. Accordingly, under load, the square wave voltage generator sees an almost ohmically impedance and delivers the maximum power to the resonant circuits. When the phase is displaced by 30°, the cos $\phi$ factor is about 0.86. The values of the impedances for the basic frequency component of the output current of the square wave voltage generator and the third harmonic of the output current preferably have the same magnitude.

During no-load operation, the parallel resonant circuit is adjusted to the fundamental frequency of the square wave voltage generator. As a result, the fundamental frequency component of its output current practically disappears and, therefore, the phase condition is of no significance.

The load not only dampens but also detunes the parallel resonant circuit. It has been found that, even for a low ratio of the energy factors of undampened to dampened resonant circuit, the ratio of the cos $\phi$ factors can be increased by a multiple. The detuning of the parallel resonant circuit by the load results in a voltage increase at the parallel resonant circuit which makes possible a multiple of, for example, four to six times the power of a parallel resonant circuit which is only dampened to the same extent.

According to a feature of the invention of the load leading to the desired phase displacement includes a coil which is connected in parallel to the coil of the parallel resonant circuit, for example, through a switch which is opened during no-load operation. When the sinusoidal output generator is used in cooking appliances, the inductive reactive component can be formed by the mutual inductance of the metallic cooking vessel which is coupled through a transformer to the coil of the parallel resonant circuit. Therefore, a particularly suitable cooking vessel is one of non-magnetic material, particularly stainless steel, which has this property as a result of its alloy. The active component if formed by the eddy current losses of the cooking vessel.

According to another feature of the invention, the square wave voltage generator has a switching output stage. The switches include transistors which can be switched off or switched through for only a finite time.

During these time periods, peak leakage powers occur which can be a multiple of the rated power and may lead to the destruction of the transistor. Preferably, the peak leakage powers in the switches formed by the transistors are significantly reduced by bridging each of these switches by means of a capacitor. This is particularly true when the switches are formed by push-pull operated transistors whose collector-emitter paths are connected in series. In this case, the capacitors are connected in parallel to the collector-emitter paths of the transistors. Due to the phase displacement of the essentially rectangular output current and square wave voltage, not only the breaking losses but also the closing losses are reduced. The capacitors prevent excessively steep edges of the square wave voltage, so that the transistors are switched practically without losses and the efficiency of the sinusoidal output generator is further increased.

Another advantage of the sinusoidal output generator according to the invention resides in the fact that the power which can be uncoupled from the coil of the parallel resonant circuit can be controlled even by a slight change of the basic frequency of the square wave voltage generator. When the basic frequency is reduced, more power is withdrawn from the square wave voltage generator, because the impedance for the basic frequency component of the output current becomes less ohmic and the phase displacement between the basic frequency component and the square wave voltage becomes smaller. When the basic frequency of the square wave voltage generator is increased, the impedance of the basic frequency component is increased and, simultaneously, the phase displacement between the basic frequency component of the output current and the square wave voltage is increased inductively. This results in a reduced output power.

In both cases, however, the approximately rectangular or trapezoidal output current of the square wave voltage generator is distorted. According to a feature of the invention, for generating an error signal for controlling the power consumption of the load, a frequency control stage responds to the amplitude of the output current of the square wave voltage generator at a predetermined phase angle of the square wave voltage. At this predetermined phase angle, the amplitude of the output current is a measure for the distortion of the shape of the current and, thus, for the deviation of the output current from its optimum, approximately rectangular shape. The frequency control stage preferably detects the amplitude of the output current at a phase angle of about +60° or about 180°+60° relative to the phase condition of the square wave voltage. Preferably, a maximum value storage which is actively connected between the edge of the square wave voltage and the predetermined phase angle and which stores the maximum value of the amplitude of the output current during this angle range. The storage content can be directly utilized for controlling the basic frequency.

DETAILED DESCRIPTION OF PREFERRED EMBODIMENTS

Figure 1:
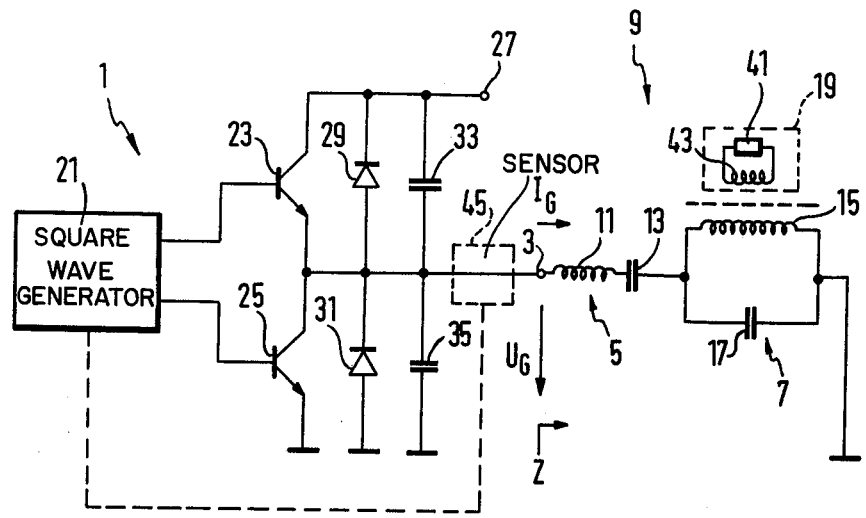
FIG. 1 is a schematic block diagram of a sinusoidal output generator for a cooking appliance.

FIG. 1 shows a schematic block diagram of a square wave voltage generator 1 having an output connection 3. A series resonant circuit 5 and a parallel resonant circuit 7 arranged in series with each other, form a network 9 connected between the connection 3 and ground. The series resonant circuit 5 includes a coil 11 and a capacitor 13; the parallel resonant circuit 7 is formed by a coil 15 and a capacitor 17 and is connected to ground. When the generator is used in cooking appliances, a metallic object, for example, a pan or a cooking pot, is coupled inductively as load 19 to the coil 15. The latter induces eddy currents in the metal parts of the load 19.

The square wave voltage generator includes a free-running square wave control oscillator 21 which, at intervals, alternately switches transistors 23 and 25 arranged for push-pull switching operation, so that one transistor becomes conductive only when the previously conductive transistor has returned to its off state. The collector-emitter paths of the transistors are connected in series between a positive operating voltage source 27 and ground. Connected parallel to the collector-emitter paths of the transistors 23 and 25 are respective free-wheeling diodes 29 and 31 which are connected in the blocking direction, and, hence, are anti-parallel free-wheeling diodes, and capacitors 33 and 35.

Figure 2A:
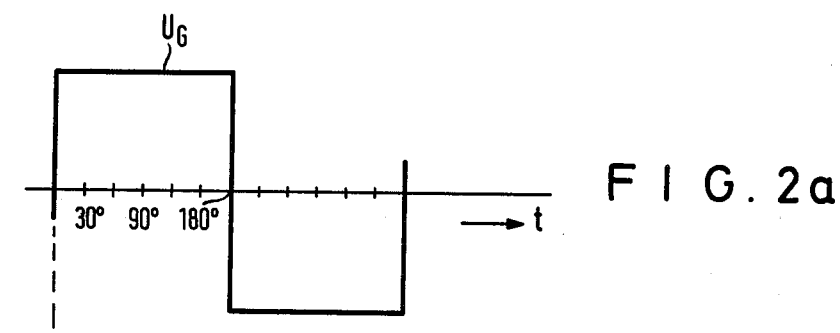
FIGS. 2a and 2b show the shape, over time, of the output voltage and the output current of a square wave voltage generator which is used for exciting a resonant circuit network of the circuit arrangement according to FIG. 1.

The leakage power of the square wave voltage generator 1 should be as low as possible during no-load operation, i.e., when the load 19 is uncoupled from the coil 15. During loaded operation, i.e., when the load 19 is coupled to the coil 15, the switching losses of the transistors 23 and 25 should be as low as possible and the power supplied to the coil 15 should be as shigh as possible. The square wave voltage generator 1 produces the square wave voltage $V_G$, which varies in dependence on time t and is illustrated in FIG. 2a, between the connection 3 and ground. The current flowing into the network 9 is indicated by $I_G$ in FIG. 1. Its shape, over time, is dependent on the complex, frequency-dependent impedance Z of the network 9 and is composed of a basic frequency component having the basic frequency $f_G$ of the square wave voltage $U_G$ determined by the control oscillator 21 and the current component of the harmonics of the basic frequency $f_G$. Aside from the basic frequency component the current component of the third harmonic $3f_G$ of the basic frequency $f_G$ is particularly noted. In order to keep the basic frequency component of the current $I_G$ as low as possible, in the case of no-load operation, the unloaded parallel resonant circuit 7 is adjusted to the basic frequency $f_G$. As a result, the no-load losses are essentially determined by the impedance of the network to the third harmonic $3f_G$.

Figure 2B:
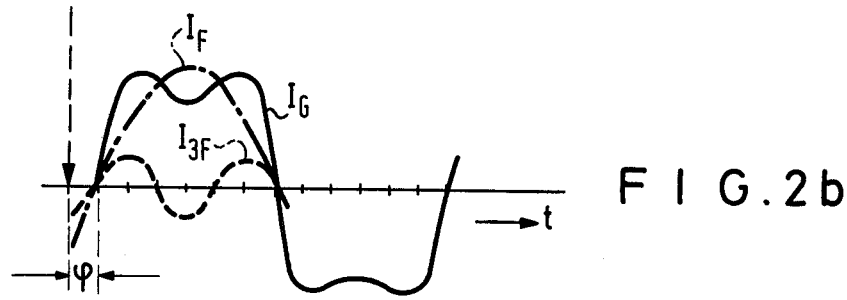
Figure 3A:
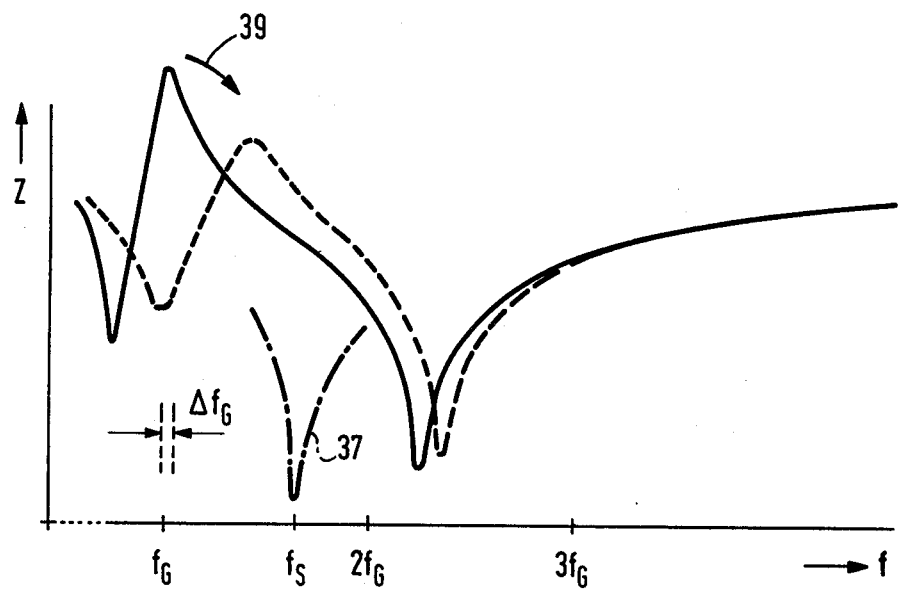
FIGS. 3a, b show the frequency shape of magnitude and phase of the input impedance of the resonant circuit network of the circuit arrangement according to FIG. 1.
Figure 3B:
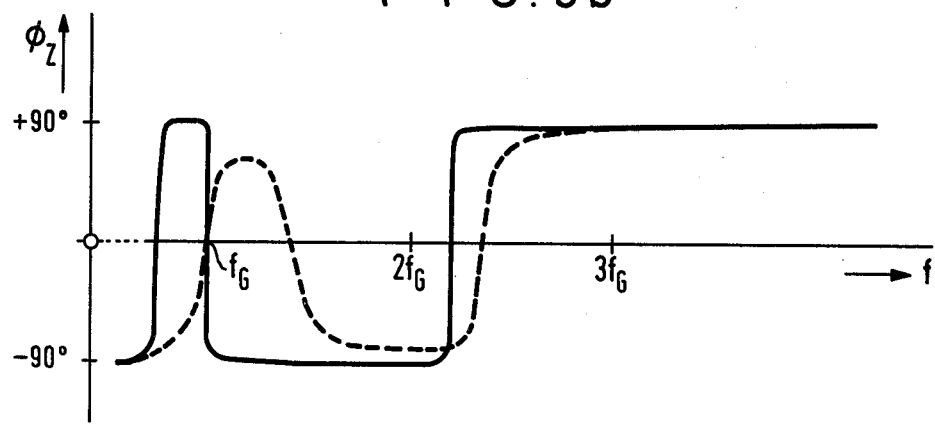

The resonant frequency of the series resonant circuit is selected, on the one hand, to be higher than the basic frequency $f_G$ and, on the other hand, lower than the third harmonic of the basic frequency, i.e., lower than $3f_G$. As a result, the magnitude of the complex impedance Z of the network 9 varies depending on the frequency f as illustrated in FIG. 3a by a solid line during no-load operation. The magnitude of the impedance becomes a maximum at the basic frequency $f_G$ of the square wave voltage generator because of the parallel resonance of the parallel resonant circuit 7. A minimum magnitude occurs at lower as well as at higher frequencies. The minimum at the frequencies lower than the parallel resonance maximum is created by the series resonance of the parallel resonant circuit 7 which is capacitive at this frequency with the series resonant circuit 5 which is inductive at this frequency. The magnitude of the impedance of the series resonant circuit 5 alone is illustrated in FIG. 3a by a dash-dot line at 37. The above-mentioned dimensioning of the series resonant circuit 5 causes the phase $\Phi_Z$ of the impedance Z of the network 9, as illustrated in FIG. 3b by a solid line for no-load operation in dependence on the frequency f, always to be 90° inductive at frequencies of the third harmonic, i.e., at $3f_G$. The corresponding current component $I_{3F}$ is shown by a broken line in FIG. 2b. Due to the constant phase condition of the network 9 at the frequency $3f_G$, the phase condition of the current component $I_{3F}$ is constant relative to the square wave voltage $U_G$.

The efficiency of the square wave voltage generator 1 reaches a maximum when the impedance Z is essentially ohmic, to wit, the square wave voltage $U_G$ generates a square wave current $I_G$ with essentially equal phases.

By detuning the parallel resonant circuit 7 the basic component $I_F$ of the generator current is displaced inductively by a phase angle of $\phi=30°$ relative to the square wave voltage $U_G$. In FIG. 2b, the basic component $I_F$ is shown as a dash-dot line. Superposing the 30° out-of-phase current $I_F$ and the current $I_{3F}$ results in an approximately rectangular or trapezoidal generator current $I_G$ which in its totality is inductively out-of-phase by 30° relative to the square wave voltage $U_G$. The value or the phase of the impedance Z of the network 9 resulting from detuning the parallel resonant circuit 7 by the load 19 is shown in broken lines in FIGS. 3a and 3b. In FIG. 3a, an arrow 39 indicates the direction in which the maximum of the parallel resonance shifts toward higher frequencies. The resonant circuits are dimensioned so that, in the case of detuning by the load 19, the value minimum having the lower frequency to occur at the basic frequency $f_G$, whereby the impedance for the basic frequency component $I_F$ of the generator current $I_G$ reaches a maximum. This corresponds to a resonance step-up.

To be able to detune the parallel resonant circuit 7, the load must also comprise an inductive component 43 in addition to an ohmic, i.e., merely damping component 41. According to an embodiment of the invention, inductive component of the load impedance is obtained by suitable selection of the material of the cooking appliance to be inductively coupled to the coil 15. According to another embodiment, an additional coil, not shown, is connected in parallel to the coil 15 by means of a switch. Suitable materials are, for example, those with non-ferromagnetic properties, particularly stainless steel and aluminum.

The leakage power generated in the transistors 23 and 25 during the switching procedure may be relatively high when the square wave voltage $V_G$ has already been switched to a high level as long as a relatively high current $I_G$ still flows through the transistor. Due to the phase displacement of the current edges relative to the voltage edges, the capacitors 33 and 35 not only reduce the switching losses created when the transistors are switched off, but also the transistor losses created when they are switched on. When switched off, the capacitors slow down an excessively quick voltage rise in the transistors, so that these transistors are free of charge carriers in the range of low voltage. Accordingly, this results in a leakage power which is practically insignificant. Moreover, the out-of-phase current has the result that the square wave voltage does not only go back to zero potential, but are driven to the opposite potential by the reactive currents of the capacitor. The voltage is prevented from oscillating beyond the zero potential by the diodes 29 and 31.

Figures 4A, 4B, 4C:
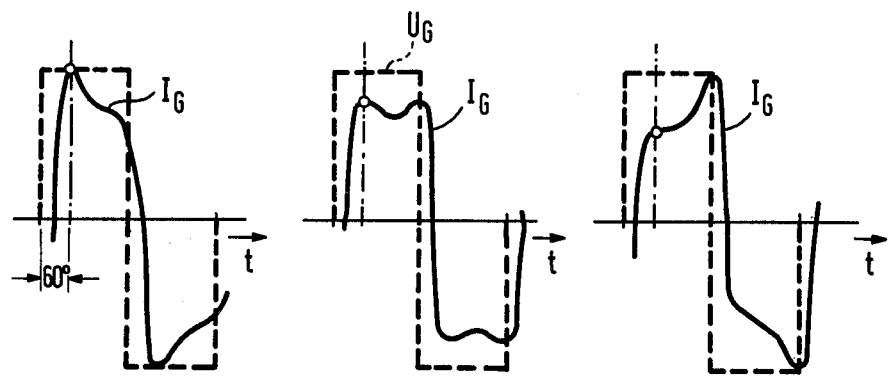
FIGS. 4a through c show the shape, over time, of the output voltage and of the output current of the square wave voltage generator of the circuit arrangement according to FIG. 1 for various basic frequencies.

The power which can be uncoupled from the coil 15 can be controlled by modifying the basic frequency $f_G$ of the square wave voltage generator 21. For generating the control voltage, the voltage at the parallel resonant circuit 7 or the power intake of the load 19 is utilized. In FIG. 1, the shape, over time, of the generator current $I_G$ is detected by means of a sensor 45 and is utilized for controlling the basic frequency $f_G$ of the square wave voltage generator 21. FIGS. 4a through 4c show the shape, over time, of the generator current $I_G$ for different basic frequencies $f_G$. In FIG. 4b, the square wave voltage generator 21 is adjusted to that frequency at which the desired trapezoidal shape, over time, of the current results. FIGS. 4a and 4c show the deviations of the generator current $I_G$ from the nominal shape when the generator frequency is reduced or increased. For generating the control voltage, use is made of the current amplitude at the time of a maximum of the current component of the third harmonic when this third component is superposed on the basic frequency component of the current in the same direction. Such a case occurs, for example, when the phase is displaced by 60° relative to the square wave voltage.

Figure 5:
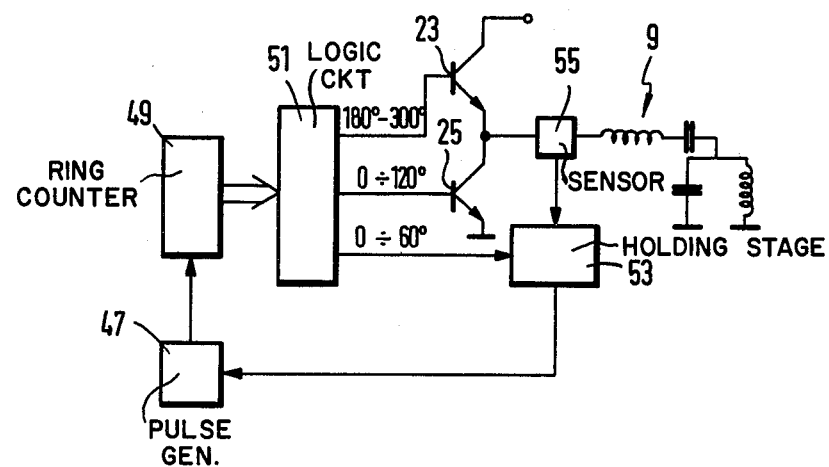
FIG. 5 is a schematic block diagram of a frequency control stage for controlling the power output of the sinusoidal output generator.

A circuit arrangement suitable for power contol is illustrated in FIG. 5. A free-running pulse generator 47 is connected to a ring counter 49 whose counter outputs control a logic circuit 51. The logic circuit 51 has three outputs, the first of which, in a phase range of 0° to 60°, generates an output signal which controls a holding stage 53. The two other outputs are effective in the phase ranges 0° to 120° and, respectively, 180° to 300° and, in intervals, control the transistors 23,25. The holding stage 53 is connected to a current sensor 55 which is coupled, for example, through a transformer, to the generator current flowing to the network 9, so that the holding stage 53 stores the maximum amplitude of the generator current occurring in the phase angle range of 0° to 60°. The output signal of the holding stage 53 corresponding to the maximum amplitude forms a narrower signal, which corresponds to the deviation of the generator frequency from the nominal value and is delivered to the pulse generator 47 for controlling the frequency.

In a specific embodiment, the network 9 is dimensioned as follows:
Coil 11: 77 µH
Capacitor 13: 0.22 µF
Coil 15: 116 µH Capacitor 17: 0.3 μF

I claim:

1. Sinusoidal output generator, comprising a parallel resonant circuit, a series resonant circuit, a square wave voltage generator, a load, said parallel resonant circuit being connected in series with said series resonant circuit and together forming a network coupled to the output of said square wave voltage generator, the load being coupleable to said parallel resonant circuit, the resonant frequency of said parallel resonant circuit being substantially equal to the fundamental frequency of said square wave voltage generator and lower than the resonant frequency of said series resonant circuit wherein the resonant frequency of said series resonant circuit is lower than the frequency of the third harmonic of the fundamental frequency of said square wave voltage generator, the load coupleable to said parallel resonant circuit has a complex impedance including an active component and a reactive component, and said series and parallel resonant circuits have parameters relative to the impedance of said load so that during load operation, a phase displacement of about 20°–40° occurs between the fundamental frequency component of the output current and the fundamental frequency of the output voltage of said square wave voltage generator, and said square wave voltage generator includes frequency control means responsive to one of the output voltage and the output current of said square wave voltage generator and the voltage at said parallel resonant circuit for controlling the power consumption of the load, said frequency control means including a current sensor stage responsive to the amplitude of the output current of said square wave voltage generator and arranged to be switched at a predetermind phase angle of the square wave voltage to generate an error signal.

2. A device according to claim 1, wherein said current sensor stage includes a holding stage operative to store the maximum value of the amplitude of the output current during the range between an edge of the square wave voltage and the predetermined phase angle of the square wave voltage.

* * * * *